Patented Feb. 26, 1929.

1,703,365

UNITED STATES PATENT OFFICE.

WERNER SCHULEMANN, OF VOHWINKEL-ON-THE-RHINE, AND FRITZ SCHÖNHÖFER AND FRITZ MIETZSCH, OF ELBERFELD-ON-THE-RHINE, GERMANY, ASSIGNORS TO WINTHROP CHEMICAL COMPANY, INC., OF NEW YORK, N. Y.

NEW 6-ALKOXY-8-AMINO-QUINOLINES.

No Drawing. Application filed January 30, 1926, Serial No. 85,030, and in Germany April 29, 1925.

The present invention concerns the manufacture of the hitherto unknown 6-alkoxy-8-amino-quinolines, which likewise exhibit antipyretic properties similar to those of the 5-amino-8-ethoxy-quinoline, and also exert a strong specific destroying action on blood parasites.

These compounds are obtained by the reduction of 6-alkoxy-8-nitro-quinolines or from 6-alkoxy-8-azoaryl-quinolines according to the methods ordinarily used for the reduction of these compounds. The manufacture of the new compounds can also be carried out by the alkylation of the oxygen of the hydroxyl group of primary bodies such for example as 6-hydroxy-8-formyl-amino-quinoline or 6-hydroxy-8-benzalaminoquinoline with subsequent splitting off of the formyl or benzal groups or by direct alkylation of 6-hydroxy-8-amino-quinoline.

The 6-alkoxy-8-amino-quinolines are intended to find application as curative products and to serve as intermediates for the manufacture of derivatives which are of value in pharmacy.

The following examples will serve to illustrate our invention, it being understood that the proportions given and the mode of working may be varied without deviating from our invention. The new products are generally whitish crystalline products forming soluble salts with hydrochloric acid.

Example 1.

The following example illustrates one method of preparing 6-methoxy-8-amino-quinoline having most probably the following formula:

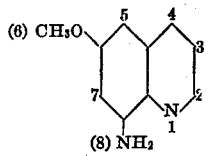

5 kilos of 6-methoxy-8-nitro-quinoline are dissolved in 20 litres of pure concentrated hydrochloric acid of 35%, the solution is heated to 100° C. and poured while at this temperature into 60 litres of a stannous chloride solution, containing 600 grams of stannous chloride per litre. After heating for one hour to 100° C. 100 litres of concentrated hydrochloric acid of 35% are added, when after cooling the stannous chloride double salt separates; this is filtered off, washed with hydrochloric acid of 30% and decomposed in the customary manner.

The resulting 6-methoxy-8-amino-quinoline distils at 137–138° C. at a pressure of about 1 mm. of mercury. It forms a viscous, light yellow oil, which solidifies to an almost white crystalline mass, having a melting point of 41° C. With hydrochloric acid it forms a beautifully crystalline dihydrochloride, possessing an orange colour and which dissolves in cold water with difficulty. Instead of stannous chloride other reducing agents can be used, such as zinc or iron, or electrolytic reduction may also be resorted to, etc.

Example 2.

The following example illustrates one method for preparing 6-ethoxy-8-amino-quinoline having most probably the following formula:

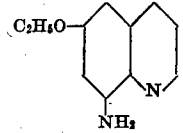

188 grams of 6-hydroxy-8-formyl-amino-quinoline are introduced into a solution of 23 grams of sodium in 3 litres of alcohol. To this are added 156 grams of ethyl iodide, after which boiling under reflux action takes place for some 4 hours. The solution is filtered from the precipitated sodium iodide, the alcohol is distilled off and the residue is dissolved by extraction with ether, the ethereal solution is washed several times with caustic soda solution of 30% and finally with water. After distilling off the ether, the residue is subjected to hydrolysis by dissolving in 3 litres of dilute sulphuric acid of about 20% strength and heating under reflux action for about 4–6 hours The solution is neutralized with sodium carbonate, extracted with ether, the ethereal solution is washed thoroughly with caustic soda solution of 30% and with water and thereupon dried over anhydrous potassium carbonate, after which the ether is distilled off. The 6-ethoxy-8-amino-quinoline thus produced distils at 144–145° C. at a pressure of about 1 mm. The yellow, oily distillate solidifies comparatively quickly to a coarse crystalline mass of a melting point of 60° C. The dihydrochloride exhibits very similar properties with regard to colour and solubility to those of the lower homologue described in Example 1.

We claim:

1. The herein described new 6-alkoxy-8-amino-quinolines having most probably the following formula:

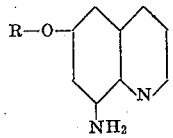

R standing for an alkyl group, which are generally whitish crystalline powders forming soluble salts with hydrochloric acid, exhibiting antipyretic properties and exerting a strong specific destroying action on blood parasites.

2. A process for the manufacture of 6-alkoxy-8-amino-quinolines from compounds having most probably the following formula:

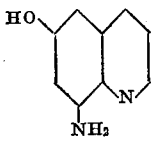

which comprises alkylating the hydroxyl radical.

3. A process for the manufacture of 6-alkoxy-8-amino quinoline compounds which comprises subjecting a compound of the general formula

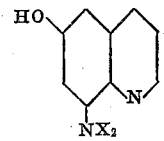

wherein $NX_2$ represents an amino group of which the hydrogen atoms may be replaced by acidyl radicals, to the action of an alkylating agent.

4. A process for the manufacture of 6-alkoxy-8-amino quinoline compounds which comprises subjecting a 6-hydroxy-8-acylamino-quinoline compound to the action of an alkylating agent, and subjecting the compound thus produced to acid hydrolysis.

5. The herein described new 6-ethoxy-8-amino quinoline having most probably the following formula:

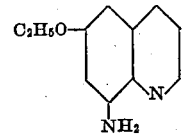

being a crystalline material melting at about 60° C., forming soluble salts with hydrochloric acid and exhibiting antipyretic properties.

In testimony whereof we have hereunto set our hands.

WERNER SCHULEMANN.
FRITZ SCHÖNHÖFER.
FRITZ MIETZSCH.